United States Patent [19]
Ma

[11] Patent Number: 5,828,552
[45] Date of Patent: Oct. 27, 1998

[54] HEAT DISSIPATING STRUCTURE OF A NOTEBOOK COMPUTER

[76] Inventor: Hsi-Kuang Ma, 4F, No. 48, Sec. 2, Chung Cherng Rd, Taipei, Taiwan

[21] Appl. No.: 695,913

[22] Filed: Aug. 12, 1996

[51] Int. Cl.$^6$ ................................................. H05K 7/20
[52] U.S. Cl. ...................... 361/704; 174/16.3; 361/680; 361/687
[58] Field of Search .................... 361/680, 687, 361/699, 700–704, 710, 715

[56] References Cited

U.S. PATENT DOCUMENTS

| | | | |
|---|---|---|---|
| 5,552,960 | 9/1996 | Nelson et al. | 174/16.3 |
| 5,588,483 | 12/1996 | Ishida | 361/687 |
| 5,621,613 | 4/1997 | Haley et al. | 361/687 |

Primary Examiner—Gregory D. Thompson
Attorney, Agent, or Firm—Bacon & Thomas

[57] ABSTRACT

A heat dissipating structure of a notebook computer, including a metal heat conductive plate mounted to the mainframe of a notebook computer and disposed in contact with the CPU and having an upright wall at the rear side, a metal coupling plate mounted on the upright wall of the metal heat conductive plate and having a horizontal U-groove at the back, a metal heat collecting panel mounted on the mainframe of the notebook computer and fastened to the coupling plate and the upright wall of the heat conductive plate by screws and having a horizontal U-groove at the front side incorporating with the horizontal U-groove of the metal coupling plate into a circular axle hole, a tubular metal revolving shaft mounted in the circular axle hole between the heat collecting panel and the coupling plate and having a plurality of mounting leaves symmetrically raised from the periphery near two opposite ends and respectively fastened to the LCD of the notebook computer, and a heat dissipating tube mounted in the revolving shaft and having two opposite ends respectively embedded in the LCD of the notebook computer.

7 Claims, 4 Drawing Sheets

HEAT DISSIPATING STRUCTURE OF A NOTEBOOK COMPUTER

BACKGROUND OF THE INVENTION

The present invention relates to heat dissipating devices, and relates more particularly to the heat dissipating structure of a notebook computer which can efficiently dissipate heat from the CPU of the mainframe of the notebook computer during its operation.

When a notebook computer is operated, heat must be quickly carried away from the CPU so that the operation of the CPU can be maintained normal. Because of limited space and battery power supply, it is not practical to install a fan in a notebook computer for carrying heat from the CPU. Therefore, heat conductive plates and tubes are commonly used in notebook computers for the dissipation of heat. FIG. 1 shows the heat dissipating arrangement of a notebook computer according to the prior art. As illustrated, a heat sink C is mounted in the mainframe of the notebook computer around the CPU A, and heat dissipating tubes B are connected between the CPU A and the heat sink C, for permitting heat to be quickly transmitted from the CPU A to the heat sink C. This structure of heat dissipating arrangement is still not satisfactory in function. Because the mainframe is closely attached to the table top or the user's lap, heat cannot be efficiently dissipated into the air during the operation of the notebook computer.

SUMMARY OF THE INVENTION

The present invention provides a heat dissipating structure which eliminates the aforesaid problem. According to one embodiment of the present invention, the heat dissipating structure comprises a metal heat conductive plate mounted to the mainframe of a notebook computer and disposed in contact with the CPU and having an upright wall at the rear side, a metal coupling plate mounted on the upright wall of the metal heat conductive plate and having a horizontal U-groove at the back, a metal heat collecting panel mounted on the mainframe of the notebook computer and fastened to the coupling plate and the upright wall of the heat conductive plate by screws and having a horizontal U-groove at the front side incorporating with the horizontal U-groove of the metal coupling plate into a circular axle hole, a tubular metal revolving shaft mounted in the circular axle hole between the heat collecting panel and the coupling plate and having a plurality of mounting leaves symmetrically raised from the periphery near two opposite ends and respectively fastened to the LCD of the notebook computer, and a heat dissipating tube mounted in the revolving shaft and having two opposite ends respectively embedded in the LCD of the notebook computer. According to an alternate form of the present invention, at least one drive gear is fixedly mounted around the tubular metal revolving shaft, and at least one driven gear is turned about an axis in the mainframe of the notebook computer and respectively meshed with the at least one drive gear, each of the at least one driven gear having a heat conductive projecting plate, which is turned out of the notebook computer to lift the mainframe from the supporting surface when the notebook computer is opened.

DETAILED DESCRIPTION OF THE PREFERRED EMBODIMENT

Figure 1:
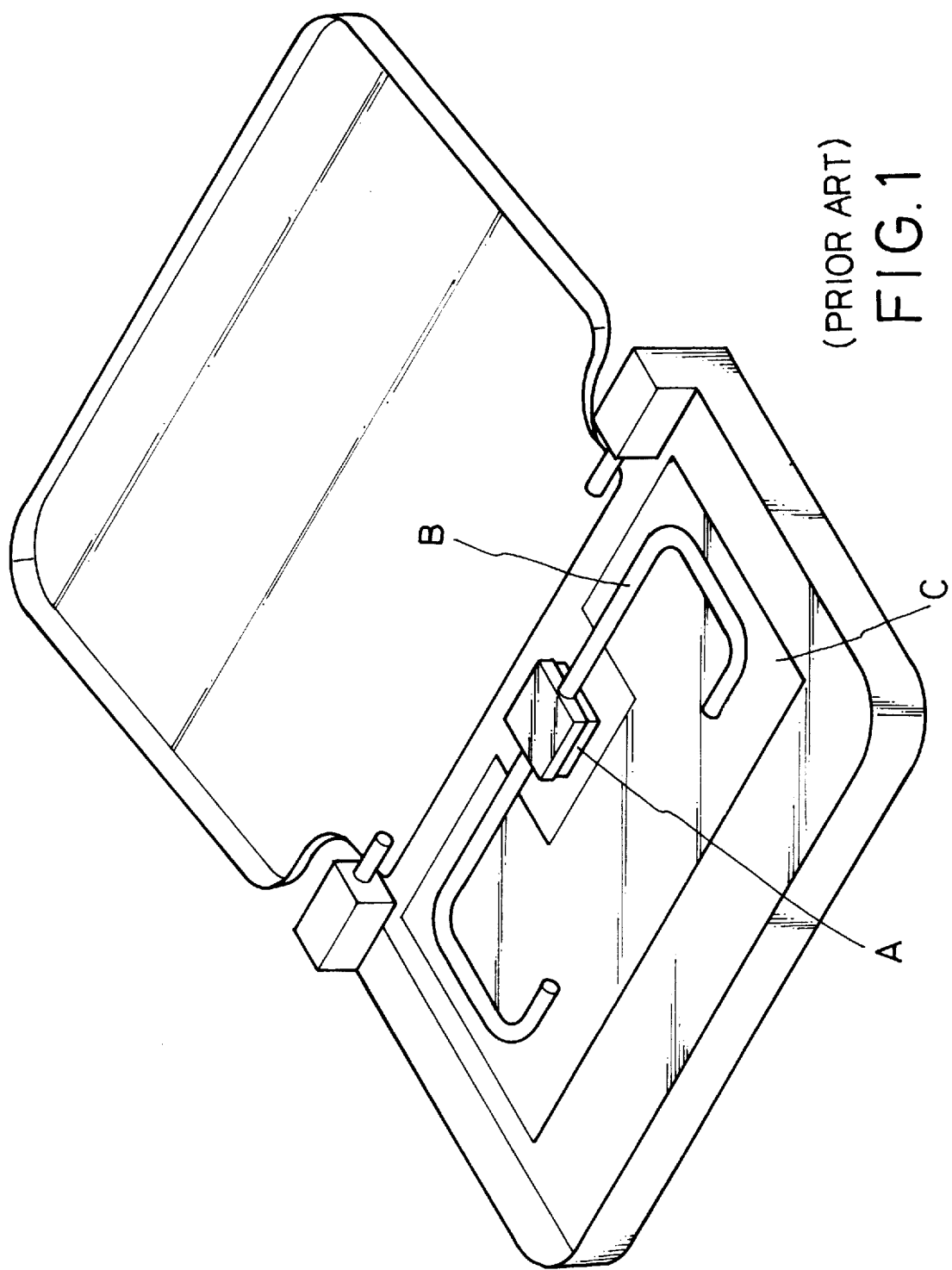
FIG. 1 shows the heat dissipating arrangement of a notebook computer according to the prior art.
Figure 2:
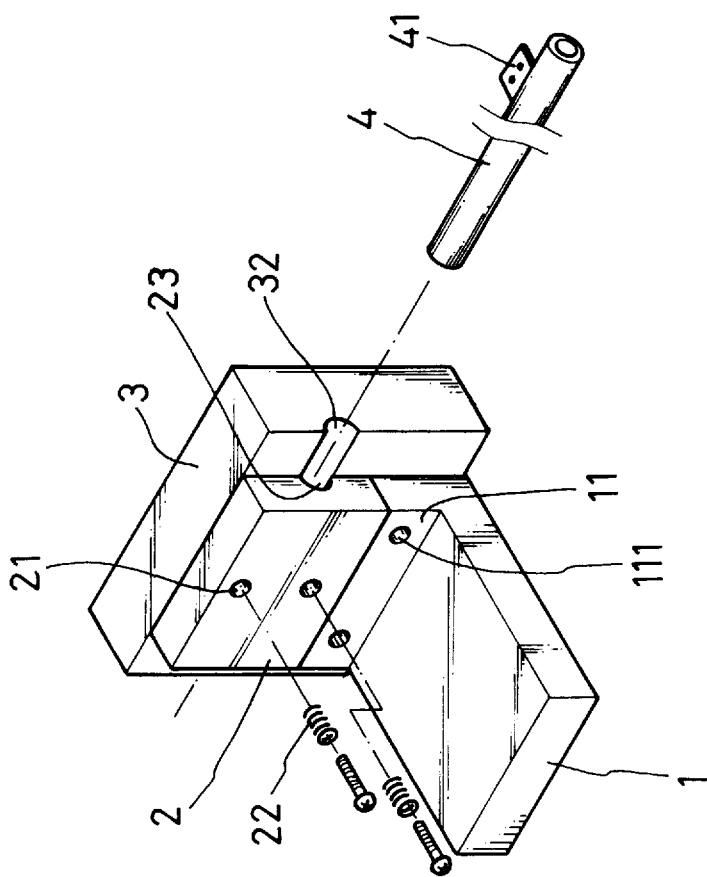
FIG. 2 is an elevational view of a heat dissipating structure according to the present invention.

Referring to FIG. 2, the present invention comprises a heat conductive plate 1, a coupling plate 2, a heat collecting panel 3, and a revolving shaft 4.

Figure 3:
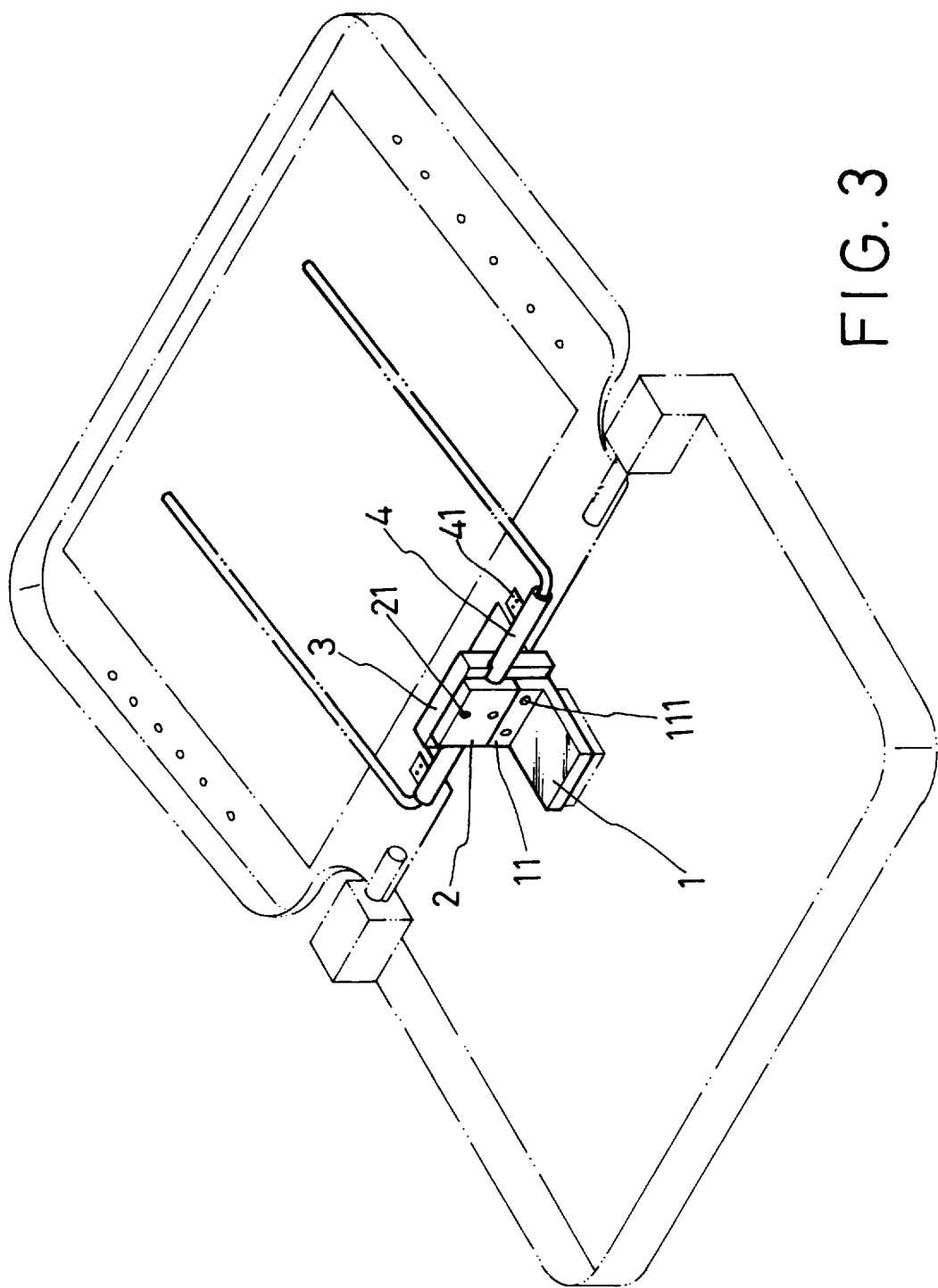
FIG. 3 shows the heat dissipating structure of the present invention installed in a notebook computer.

Referring to FIG. 3 and FIG. 2 again, the heat conductive plate 1 is made from metal of high heat conductivity and adapted for attaching to the CPU at the top, having an upright wall 11 raised from the rear side at right angles, and a plurality of horizontally spaced mounting holes 111 through the upright wall 11. The coupling plate 2 is a metal block of high heat conductivity and supported on the upright wall 11 of the heat conductive plate 1 in a flush manner, having a plurality of mounting holes 21, a plurality of coil springs 2 respectively mounted within the mounting holes 21 and adapted for stopping against the heat collecting panel 3, and a horizontal U-groove 23 at the back side. Conductive plate 1 and coupling plate 2 may be integrally formed together. The heat collecting panel 3 is made from metal of high heat conductivity and perpendicularly mounted on the mainframe of the notebook computer at the rear side, having a plurality of mounting holes (not shown) respectively connected to the mounting holes 21 of the coupling plate 2 and the mounting holes 111 of the upright wall 11 of the heat conductive plate 1, and a horizontal U-groove 32 at the front side which, together with the horizontal U-groove 23 of the coupling plate 2 defines a circular axle hole for receiving the revolving shaft 4. The revolving shaft 4 is made from a metal tube of high heat conductivity and is mounted in the circular axle hole of the U-grooves 23, 32, and having a plurality of mounting leaves 41 symmetrically raised from the periphery near two opposite ends and respectively fastened to the LCD of the notebook computer near the mainframe.

Referring to FIG. 3 again, when the heat collecting panel 3, the coupling plate 2 and the heat conductive plate 1 are fastened together and the revolving shaft 4 is mounted in the circular axle hole of the U-grooves 23, 32, the heat collecting panel 3 and the heat conductive plate 1 are fastened to the mainframe of the notebook computer, and the mounting leaves 41 of the revolving shaft 4 are respectively fastened to the LCD of the notebook computer, permitting the heat dissipating tube shown in phantom lines to be mounted in the revolving shaft 4 and embedded in the LCD. Therefore, heat can be quickly carried away from the mainframe of the notebook computer during the operation of the notebook computer. The revolving shaft 4 and heat dissipating tube may be integrally formed together.

Figure 4:
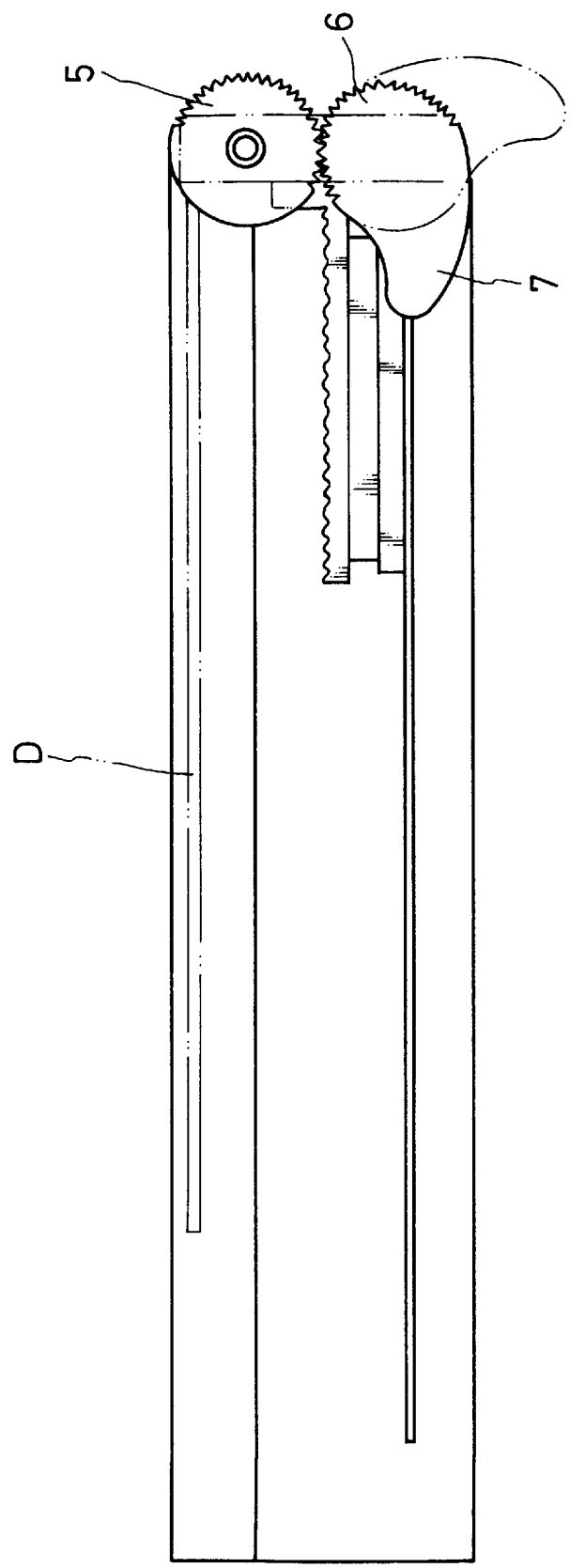
FIG. 4 shows another installation example of the present invention.

FIG. 4 shows an alternate form of the present invention, in which the aforesaid revolving shaft 4 is mounted with at least one drive gear 5 fixedly mounted around shaft 44, which is meshed with at least one driven gear 6 which is pivotally mounted for rotation about an axis in the mainframe of the notebook computer and has an arched heat-conductive projecting plate 7 at one end disposed outside the notebook computer. When the notebook computer is operated, heat can be quickly dissipated through the heat dissipating tube D and the arched heat-conductive projecting plate 7. When the notebook computer is opened, the driven gear 6 is turned through an angle, causing the arched heat-conductive projecting plate 7 to be turned outwards to lift the rear side of the notebook computer from the table top.

According to test, the temperature of the mainframe and the LCD can be maintained within 40° C. As also seen in FIG. 4, the metal heat conductive plate is provided with a corrugated top side.

It is to be understood that the drawings are designed for purposes of illustration only, and are not intended as a definition of the limits and scope of the invention disclosed.

What the invention claimed is:

1. A heat dissipating structure of a notebook computer, comprising:

a metal heat conductive plate mounted to the mainframe of a notebook computer and disposed in contact with the CPU thereof, having an upright wall raised from a rear side thereof, said upright wall having a plurality of mounting holes;

a metal coupling plate mounted on the upright wall of said metal heat conductive plate, having a plurality of mounting holes, and a horizontal U-groove at a back side thereof through the width;

a metal heat collecting panel mounted on the mainframe of the notebook computer and connected to said metal coupling plate and said metal heat conductive plate, having a plurality of mounting holes respectively connected to the mounting holes of said metal coupling plate and the mounting holes of said metal heat conductive plate by screws, and a horizontal U-groove at a front side thereof incorporating with the horizontal U-groove of said metal coupling plate into a circular axle hole; and a tubular metal revolving shaft mounted in said circular axle hole between said metal heat collecting panel and said metal coupling plate, having a plurality of mounting leaves symmetrically raised from the periphery near two opposite ends and respectively fastened to the LCD of the notebook computer.

2. The heat dissipating structure of claim 1 further comprising a heat dissipating tube mounted in said tubular metal revolving shaft and having two opposite ends embedded in the LCD of the notebook computer.

3. The heat dissipating structure of claim 2 wherein said heat dissipating tube and said tubular metal revolving shaft are integrally formed together.

4. The heat dissipating structure of claim 1 further comprising at least one drive gear fixedly mounted around said tubular metal revolving shaft, and at least one driven gear pivotally mounted for rotation about an axis in the mainframe of the notebook computer and meshed with said at least one drive gear, each of said at least one driven gear having a heat conductive projecting plate, which is turned out of the notebook computer to lift the mainframe of the notebook computer from the supporting surface when the notebook computer is opened.

5. The heat dissipating structure of claim 1 wherein said metal heat conductive plate has a corrugated top side.

6. The heat dissipating structure of claim 1 further comprising a plurality of coil springs respectively mounted around the screws in the mounting holes of said metal coupling plate and said metal heat conductive plate and stopped against said metal heat collecting panel.

7. The heat dissipating structure of claim 1 wherein said metal coupling plate and said metal heat conductive plate are integrally formed together.

* * * * *